United States Patent [19]

Himmler et al.

[11] Patent Number: 4,691,567

[45] Date of Patent: Sep. 8, 1987

[54] APPARATUS FOR DETERMINATION OF THE STATIC UNBALANCE IN A BODY

[75] Inventors: Günther Himmler, Darmstadt; Günter Knoll, Büttelborn, both of Fed. Rep. of Germany

[73] Assignee: Gebr. Hofmann GmbH & Co. KG. Maschinenfabrik, Pfungstadt, Fed. Rep. of Germany

[21] Appl. No.: 903,869

[22] Filed: Sep. 2, 1986

Related U.S. Application Data

[63] Continuation of Ser. No. 643,696, Aug. 24, 1984, abandoned.

[30] Foreign Application Priority Data

Aug. 27, 1983 [DE] Fed. Rep. of Germany ....... 3330974

[51] Int. Cl.$^4$ ............................................. G01M 1/12
[52] U.S. Cl. .................................................... 73/483
[58] Field of Search ................. 73/483, 484, 485, 486; 308/2 A; 248/608

[56] References Cited

U.S. PATENT DOCUMENTS

| | | | |
|---|---|---|---|
| 2,338,057 | 12/1943 | Petersen | 73/483 |
| 3,096,655 | 7/1963 | Peterson | 73/483 |
| 3,587,296 | 6/1971 | Povoas | 73/483 |
| 4,063,462 | 12/1977 | Himmler | 73/483 |
| 4,098,357 | 7/1978 | Harder | 248/608 |

Primary Examiner—John Chapman
Attorney, Agent, or Firm—Fleit, Jacobson, Cohn & Price

[57] ABSTRACT

A unitary adaptor plate for determining static unbalance in a body. The plate includes an outer body, a middle body, and an inner body, and each of the inner and outer bodies is connected to the middle body by means of opposed torsion elements to provide a structure that defines a gimbal system capable of rotation about two mutually perpendicular axes of rotation defining two degrees of freedom of the adaptor plate. Deflection sensors sense the inclination of the adaptor plate caused by unbalance in a body placed on the adaptor plate, and force transducers operate to restore the plate to a horizontal position and provide an output indicative of the unbalance of the body.

2 Claims, 3 Drawing Figures

APPARATUS FOR DETERMINATION OF THE STATIC UNBALANCE IN A BODY

This application is a continuation, of application Ser. No. 643,696, filed Aug. 24, 1984, now abandoned.

BACKGROUND OF THE INVENTION

The invention relates to an apparatus for determination of the static unbalance in a body, and more particularly to an improved apparatus for more accurately determining static unbalance by eliminating bearing friction as a factor in unbalance determination and for permitting easier assembly.

Description of the Prior Art

Determination of the static unbalance in a body requires a device where the adaptor plate, on which the body to be balanced is placed, is supported on gimbals with two degrees of freedom and means for counteracting the unbalance forces exerted. A static balancing device is disclosed in U.S. Pat. No. 4,063,462, which device is also called a gravitational balancing machine, or balancing scales. The device has a gimbal-mounted adaptor plate, with bearing bolts supported in anti-friction bearings The adaptor plate is located in an axial direction by means of torsion rods, the one extremity of which is fitted to the adaptor plate and the second extremity of which is connected to the gimbal ring, or the machine housing.

The disadvantage of this known device is that the gimbal assembly is composed of several parts and subassemblies so that high precision in manufacture and assembly are absolutely necessary.

Another disadvantage consists in that the achievable unbalance correction is limited owing to the moments resulting from friction in the bearings, which can never be completely eliminated.

SUMMARY OF THE INVENTION

Therefore, it is an object of the present invention to provide an apparatus for determination of static unbalance in a body, which apparatus constitutes an improvement to the known device and which operates more precisely, while being manufactured more easily.

Briefly stated, in accordance with one aspect of the present invention, apparatus is provided for accurately determining the static unbalance in a body. The apparatus includes an adaptor plate for supporting the body to be balanced and a gimbal support for the adaptor plate and having two mutually perpendicular axes of rotation defining two degrees of freedom of movement of the adaptor plate. The gimbal support serves to counteract the forces that result from the unbalance of the body. The rotation of the gimbal support takes place about axially rigid torsion members that can deflect torsionally about their own axes, and the gimbal support is provided as a single, undetachable unit.

Because the gimbal system is a single undetachable unit, both the manufacture of individual parts and their rather difficult assembly are eliminated. Furthermore, there are no frictional losses in the apparatus resulting from bearing friction, and hence no incorrect measurements because the radial and axial forces are received completely and exclusively in the torsion elements.

BRIEF DESCRIPTION OF THE DRAWINGS

The preferred embodiment is illustrated in the accompanying drawings, in which.

DESCRIPTION OF THE PREFERRED EMBODIMENT

Figure 1:
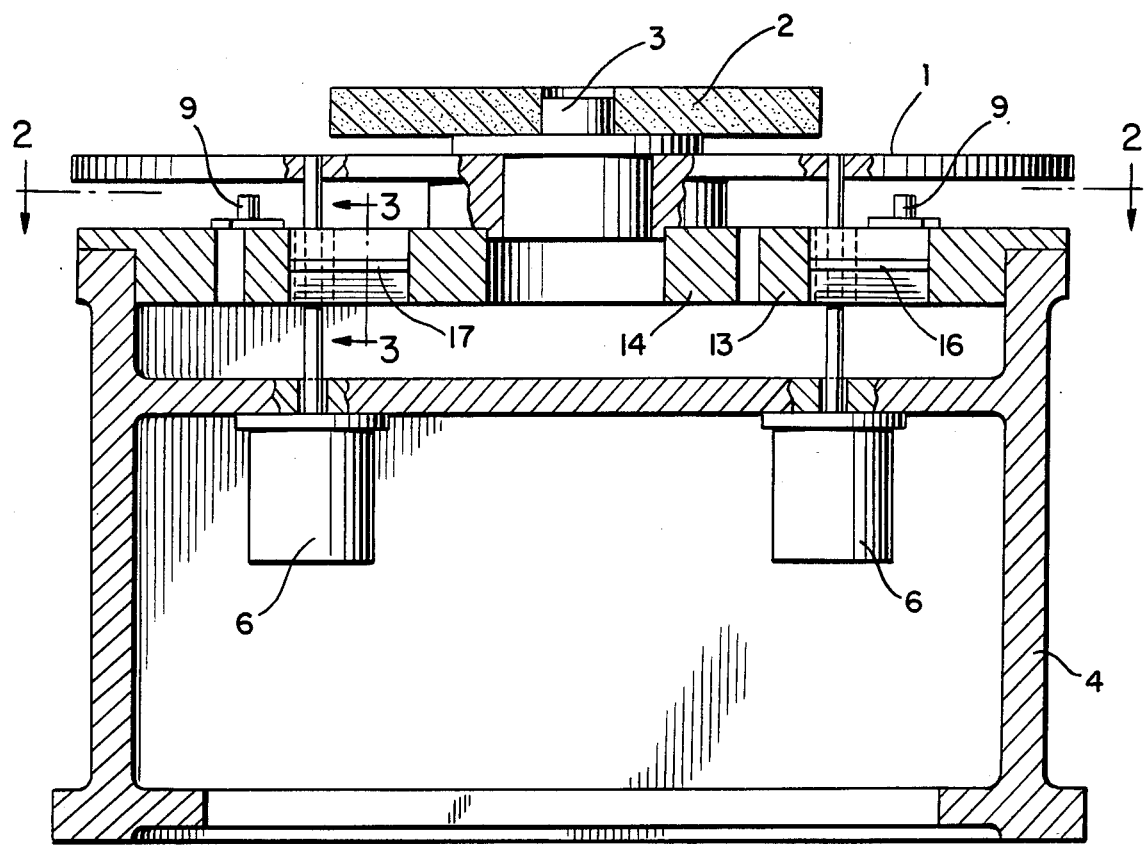
FIG. 1 is a cross-sectional view of the apparatus taken along the line 1—1 of FIG. 2.

Referring to the drawings, and particularly to FIG. 1 thereof, the balancing apparatus illustrated includes an adaptor plate 1 on which the body 2 to be balanced is clamped by means of a centering mandrel 3. Adaptor plate 1 is mounted on a gimbal system 11 in a machine housing 4. Deflections of the adaptor plate 1 that result from unbalance of the body 2 are sensed by transducers 7, 8, 9 and 10, which are displacement-measuring sensors and can be of an electric or an optical type, the construction of which is well known to those skilled in the art.

Force transducers 5 and 6 are provided with known compensating means which provide a counteracting force as a function of the deflection of the adaptor plate 1 in order to retain the adaptor plate in its initial position.

Figure 3:
FIG. 3 is a cross-sectional view of a torsion element taken along the line 3—3 of FIG. 1.
Figure 2:
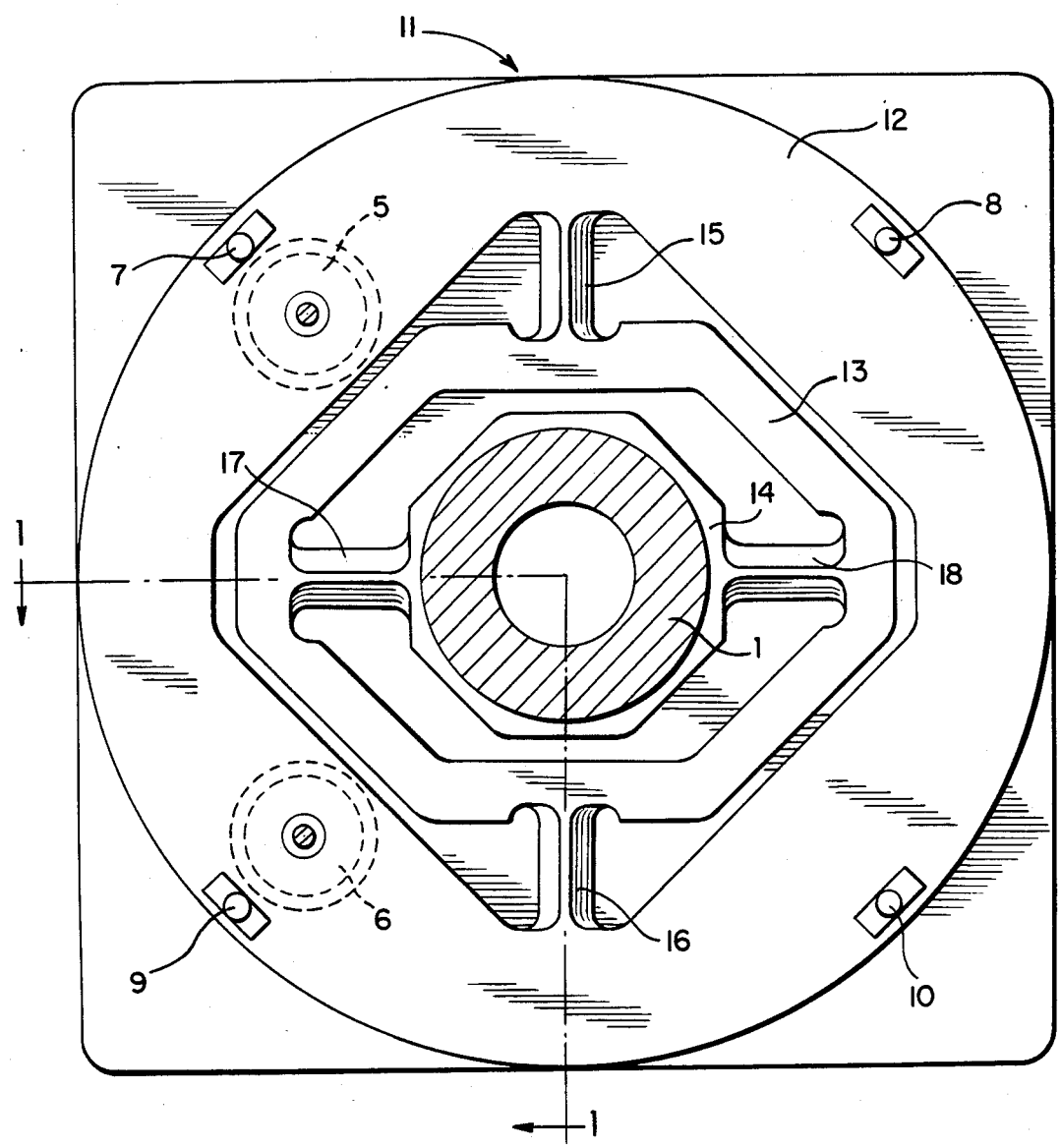
FIG. 2 is a top view of the apparatus taken along the line 2—2 of FIG. 1.

As best seen in FIG. 2, the gimbal system 11 indludes an outer body 12, which is connected directly with the machine housing 4, a middle body 13, and an inner body 14. The axes of rotation of the several parts of gimbal system 11, which are preferably situated in one plane, are defined by each of two pairs of torsion elements 15 and 16, and 17 and 18, which permit rotation about their axes. The torsion elements 15 and 16 extend between the outer body 12 and the middle body 13 and the torsion elements 17 and 18 extend between the middle body 13 and the inner body 14. The torsion elements 15 to 18 are rigid in the horizontal and vertical directions so that they readily transmit radial and axial forces exerted on them. The torsion elements are of rectangular cross section, as shown in FIG. 3, and preferably are of square cross section.

The entire gimbal system 11 is a single, undetachable unit, which is made by machining one part or by welding separate parts together.

As the gimbal system 11 is a single, undetachable unit, the difficult assembly operations inherent in the assembly of the several parts of the prior art devices, which are likely to involve errors, are omitted. Furthermore, measurement errors caused by rolling friction in the bearings included in the prior art device as shown in U.S. Pat. No. 4,063,462 are not a factor as the torsion elements 15 to 18 are flexible under rotation only, but rigid with respect to stresses and bending.

In operation, the body 2 to be balanced is placed over the centering mandrel 13 so that it is supported by adaptor plate 1. The unbalance of the body 2 causes tilting of the adaptor plate from the horizontal as a result of the movement caused by the unbalance of the body relative to centering mandrel 3. The inclination of the adaptor plate is sensed by deflection transducers 7–10, which produce output signals proportional to the amount of deflection that is sensed. The output signals from the deflection transducers are conducted to the force transducers 5, which qenerate forces to counteract the tilting of the adaptor plate 1 until the latter is restored to a horizontal position. The forces required to maintain the plate in a horizontal position are sensed as outputs from the force transducers and can be multiplied by the lever arm between the point of application of the force transducer and the center of the plate to provide the unbalance of the body. For other details of operation of the present invention reference is made to U.S. Pat. No. 4,063,462, the disclosure of which is hereby incorporated herein by reference the same as fully rewritten herein.

What is claimed is:

1. Apparatus for determination of the static unbalance in a body, said apparatus comprising: an adaptor plate for supporting the body to be balanced, a gimbal support for the adaptor plate and having two mutually perpendicular axes of rotation defining two degrees of freedom, said gimbal support counteracting the forces exerted by the unbalance, the axes of rotation of said gimbal support defined by axially rigid torsion members that can deflect torsionally about their own axes, said gimbal support provided as a single, undetachable unit including an outer body, a middle body, and an inner body wherein two twistable torsion members extend between and interconnect the outer and the middle bodies and another two twistable torsion members extend between and interconnect the middle and inner bodies, the axes of twist of said twistable torsion members lying in a single plane, said torsion members being rigid in both the vertical and the horizontal direction to transmit radial and axial forces exerted thereon, said torsion members having a substantailly square cross section defined by four longitudinally extending sides that meet to define two pairs of opposed longitudinally extending edges, one pair of opposed, edges lying in a substantially vertical plane and another pair of opposed edges lying in a substantially horizontal plane.

2. Apparatus as set forth in claim 1, in which a plurality of deflection sensing members are positioned below the adaptor plate to produce output signals proportional to the amount of deflection sensed, and a plurality of force transducers positioned below the adaptor plate and responsive to the deflection sensing member output signals to move the adaptor plate into a horizontal position, the force transducers producing an output signal indicative of the force required to maintain the adaptor plate in a horizontal position.

* * * * *